United States Patent [19]

Catterfeld

[11] 4,199,152
[45] Apr. 22, 1980

[54] HYDROSTATIC SEAL FOR CENTRIFUGAL PUMPS

[75] Inventor: Fritz C. Catterfeld, Canoga Park, Calif.

[73] Assignee: Rockwell International Corporation, El Segundo, Calif.

[21] Appl. No.: 21,739

[22] Filed: Mar. 19, 1979

[51] Int. Cl.$^2$ ............................................. F16J 15/46
[52] U.S. Cl. ........................................ 277/3; 277/15; 277/27; 277/173
[58] Field of Search .............. 277/3, 27, 70, 71, 72 R, 277/74, 75, 79, 173, 176, 15

[56] References Cited

U.S. PATENT DOCUMENTS

| | | | |
|---|---|---|---|
| 3,081,095 | 3/1963 | Hamrick | 277/3 X |
| 3,410,565 | 11/1968 | Williams | 277/27 X |
| 3,602,613 | 8/1971 | Gunther | 277/15 X |
| 3,606,350 | 9/1971 | Gravelle | 277/27 |
| 3,650,582 | 3/1972 | Casey | 277/15 X |
| 3,701,535 | 10/1972 | Born et al. | 277/3 |
| 3,806,135 | 4/1974 | Wiese | 277/15 |

FOREIGN PATENT DOCUMENTS 1075656 7/1967 United Kingdom ..................... 277/71

Primary Examiner—Robert S. Ward, Jr.
Attorney, Agent, or Firm—L. Lee Humphries; Harry B. Field

[57] ABSTRACT

The hydrostatic seal for high-differential pressure situations comprises an annular retainer plate having forward and aft ends for mounting the seal. To the annular retainer plate there is detachably mounted an annular seal housing having at least one purge fluid feed hole, at least one anti-rotation lug, and an annular aft end pressure restoration pocket. Coaxially located along the interior wall of the seal housing is an outer pressure gap interposed between the seal housing and a floating seal sleeve. The seal sleeve contains at least one purge fluid transfer hole radially located through the floating seal sleeve, an anti-rotation lug for mating with each anti-rotation lug of the seal housing, a plurality of inner pressure restoration pockets, and a pair of forward and aft axial seal balance lands. Coaxially located along the interior wall of the floating seal sleeve is an annular seal sleeve which rotates in conjunction with the rotating shaft. Interposed between the seal sleeve and the floating seal sleeve is an inner purge fluid gap which is capable of preventing the intrusion of high-pressure fluid into and through the seal.

18 Claims, 4 Drawing Figures

HYDROSTATIC SEAL FOR CENTRIFUGAL PUMPS

BACKGROUND OF THE INVENTION

1. Field of the Invention

This invention relates to seals and, more specifically, to high-temperature and high-pressure seals for the pump industry.

2. Description of the Prior Art

The requirements for high-pressure centrifugal pumping in the chemical processes, mining, dredging, and solids transport industries at temperatures above about 500° F. necessitate long life shaft seals that can operate reliably and efficiently under the most severe abrasive conditions with the pump.

Specifically, coal liquefaction processes presently being considered for commercial development will require a high-capacity and high-pressure coal slurry feed system in the process. A scale-up of present-type reciprocating feed pumps to meet the high capacity will require a large number of units with attendant high capital and maintenance costs. As an alternate approach, high-volume centrifugal pumps appear promising in meeting the high-capacity requirement of the coal liquefaction plant. However, centrifugal pumps must be designed for high speeds to meet the high-pressure requirements, and may be subject to excessive internal wear because of excessive slurry velocities.

The pump seal package for this kind of environment must be designed to be capable of sealing from 4 to 350-mesh (0.230 to 0.0018 inches) coal/oil slurry at a temperature of about 550° F. and at pressures ranging from 250 psi for the first pump stage to above about 3000 psi for the final pressure stage. The seal package must operate reliably at pressure levels of 250 psi increments. The 3000 psi pressure level was used for the design, hydraulic, and dynamic analysis.

The use of a face-contacting, pressure-balanced seal as a primary barrier 3000 psi was found to be too sensitive to operate reliably over a long period primarily because of the high accuracy required for the seal pressure balance diameter that must be maintained for fine tune face pressure load in the presence of coal slurry. Other system conditions such as pump pressure oscillations or variations in the purge fluid pressure to the mechanical seal, thermal expansion of the various pump components, led to the conclusion that the seal cavity pressure must be reduced to a more controllable level for reliable mechanical seal operation.

Pressure reducing bleedback cavities which return controlled leaking slurry flow to a lower pump pressure level were analyzed and found that the leaking velocity was too high for long-period reliable operation and therefore caused extreme material wear.

SUMMARY OF THE INVENTION

Accordingly, there is provided by the present invention a hydrostatic, high-pressure purge fluid-operated, floating ring seal for high-differential pressure situations. High-pressure, clean purge fluid provides a low-level, positive flow of purge fluid behind the impeller and leakage into the main pump flow. During operation of the pump the positive flush prevents slurry from coming into contact with the seal, and also prevents stagnation of abrasive solid particles behind the impeller. The low-pressure end of the seal is adjacent to a nearly-ambient pressure cavity. The purge fluid entering this cavity is returned to a reservoir where it is filtered, repressurized, and returned to the hydrostatic seal. These functions are effected by providing a hydrostatic seal which comprises an annular retainer plate having forward and aft ends for mounting the seal. To the annular retainer plate there is detachably mounted an annular seal housing having at least one purge fluid feed hole, at least one anti-rotation lug, and an annular aft end pressure restoration pocket. Coaxially located along the interior wall of the seal housing is a floating seal sleeve. An outer pressure gap is interposed between the seal housing and a floating seal sleeve thereby permitting the floating seal sleeve to respond to external forces. The seal sleeve contains at least one purge fluid transfer hole radially located through the floating seal sleeve, an anti-rotation lug for mating with each anti-rotation lug of the seal housing, a plurality of inner pressure restoration pockets, and a pair of forward and aft axial seal balance lands. Coaxially located along the interior wall of the floating seal sleeve is an annular seal sleeve which rotates in conjunction with the pump shaft. Interposed between the seal sleeve and the floating seal sleeve is an inner purge fluid gap which is capable of preventing the intrusion of high-pressure fluid into and through the seal.

OBJECTS OF THE INVENTION

Therefore, it is an object of the present invention to provide a hydrostatic seal capable of sealing about 4 to 350-mesh particles.

Another object of the present invention is to provide a hydrostatic seal capable of operating in a temperature range of about 550° F. or above.

Yet another object of the present invention is to provide a hydrostatic seal capable of operating in a differential pressure range of up to about and above 3500 psi.

Still another object of the present invention is to provide a hydrostatic seal capable of being self-centering.

Yet another object of the present invention is to provide a hydrostatic seal wherein no mechanical mating surfaces ever make contact during seal operation.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
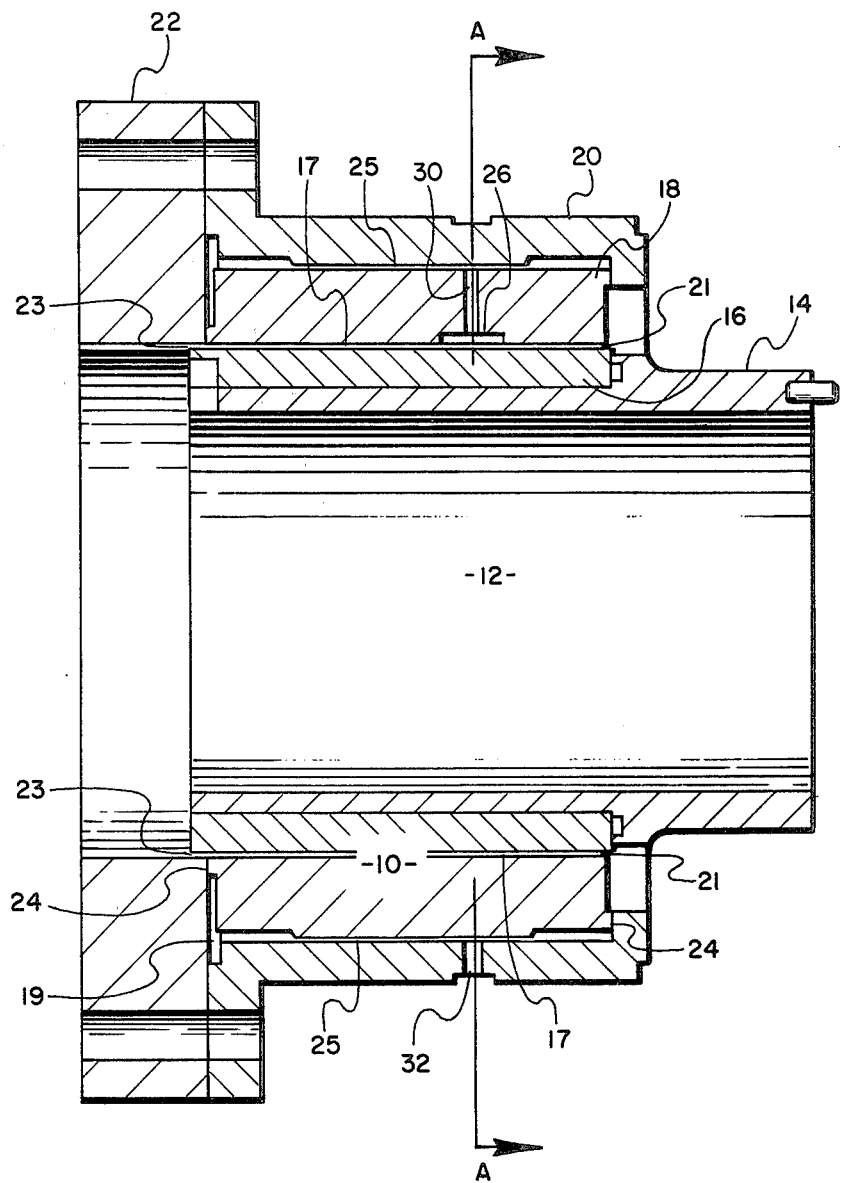
FIG. 1 is a cross-sectional view of the hydrostatic seal taken along the axis.
Figure 2:
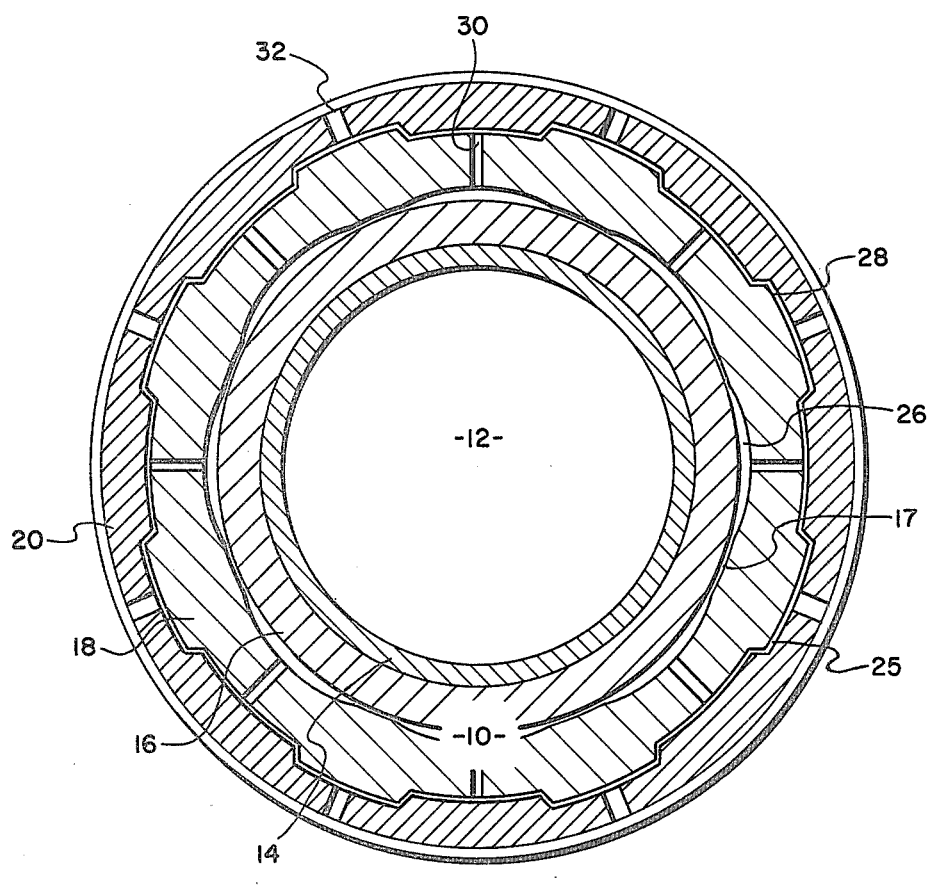
FIG. 2 is a cross-sectional view of the hydrostatic slurry seal taken perpendicular to the axis.

Referring now to FIGS. 1 and 2, wherein like numerals represent like elements throughout the figures, there is shown the hydrostatic, high-pressure purge fluid-operated, floating ring seal 10. This seal 10 is designed to operate in high-differential pressure situations. Based on hydrostatic principles, the seal 10 comprises an annular rotating seal sleeve 16 coaxially located along the circumference of a rotating shaft 12. Seal sleeve 16 is designed to mate and rotate with rotating shaft 12. This provides the means for interconnecting the seal 10 with a pump or other rotating member. Depending upon the particular requirements, shaft sleeve 14 may be interposed between seal sleeve 16 and rotating pump shaft 12. Shaft sleeve 14 would be primarily used in high-temperature situations wherein there is a need to compensate for differences in the coefficient of thermal expansion of various materials within the rotating shaft 12 and seal 10.

The floating seal sleeve 18 is coaxially located along the exterior wall of seal sleeve 16. The floating seal sleeve 18 is designed to yield to any deflection of the rotating shaft 12 or shaft sleeve 14 without impeding the function of the seal 10. Although there are many means for accomplishing this task, the preferred means is effected by having a very small gap 17 interposed between the rotating seal sleeve 16 and the non-rotating floating seal sleeve 18. Depending upon the specific design requirements, gap 17 can be varied in size and in its specific geometry. In accordance with the present invention, gap 17 has two components. The first is the gap 17 itself, while the second component comprises at least one pressure restoration pocket 26. The primary function of restoration pockets 26 is for restoring the non-rotating floating seal sleeve 18 concentric with the rotating seal sleeve 16 should the floating seal sleeve 18 be forced eccentric for any reason. Then, gap 17 can operate as a channel for high-pressure purge fluid and would provide a low-level positive flow of purge fluid from gap opening 21 behind the impeller and leaking into the main pump. This positive flush would prevent slurry from coming into contact with the primary seal and would also prevent stagnation of abrasive solid particles behind the impeller. The low-pressure end of the primary seal 10 would be adjacent to a nearly-ambient pressure cavity. Thus, purge fluid exiting from gap opening 23 and entering this cavity would be returned to a reservoir where it would be filtered, repressurized, and returned to the hydrostatic primary seal 10 for further purging. The non-rotating floating seal sleeve 18 additionally comprises a means for preventing floating seal rotation. In the preferred embodiment, this is effected by at least one anti-rotation lug 27, FIG. 2, circumferentially located along the outer wall of the floating seal sleeve 18. In the most preferred configuration, a plurality of anti-rotation lugs are used. The lugs 27 are used for mating with seal housing 20 thereby preventing rotation of the floating seal sleeve 18. Finally, the floating seal sleeve 18 can be axially balanced by a pair of forward and aft axial seal balance lands 24. These lands 24, along with annular aft end pressure restoration pocket 19, are the preferred means for maintaining the axial position and a balance load on seal 10.

Interposed between non-rotating floating seal sleeve 18 and coaxial seal housing 20 is outer pressure gap 25. This gap 25, approximately fifteen times larger than gap 17, provides for radially pressure-dampening the non-rotating floating seal sleeve 18. To accomplish this task, any means for pressurizing the seal may be used; however, in its preferred form, purge fluid is fed through the seal housing 20 via purge fluid feed hole 32. From purge fluid feed hole 32 the purge fluid fills gap 25 and annular aft end pressure restoration pocket 19. Once filled, the purge fluid flows through purge fluid transfer holes 30 into the pressure restoration pockets 26 and gap 17, thereby pressurizing the seal.

It is important to note that the hydrostatic seal purge inlet pressure is calculated to be about 500 psi above the cavity pressure between the pump impeller and the seal 10. This pressure difference accounts for pressure losses within the seal assembly.

Finally, the aft end of seal housing 20 is mated to the forward end of annular retainer plate 22. The retainer plate 22 has been designed for minimum deflection under about 3500 psi and above pump cavity loading, and thus must be exceptionally strong.

Figure 3:
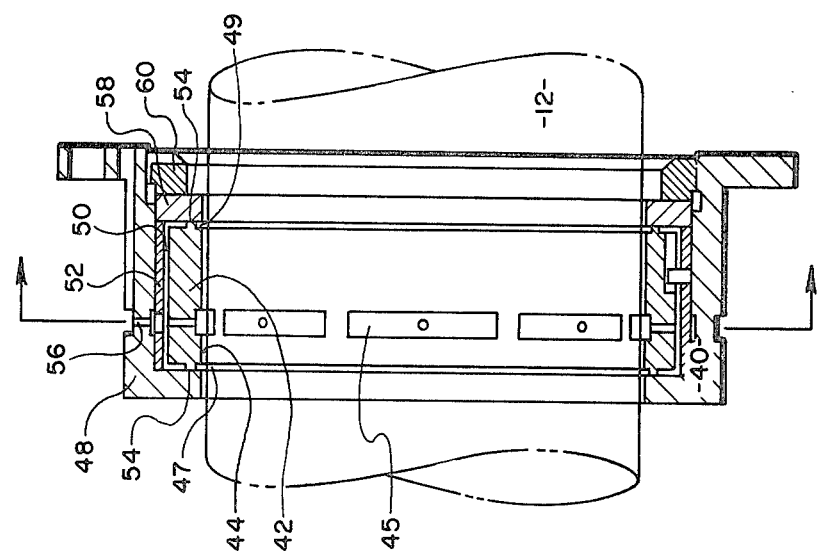
FIG. 3 is a cross-sectional view of the interstage seal taken along the axis.
Figure 4:
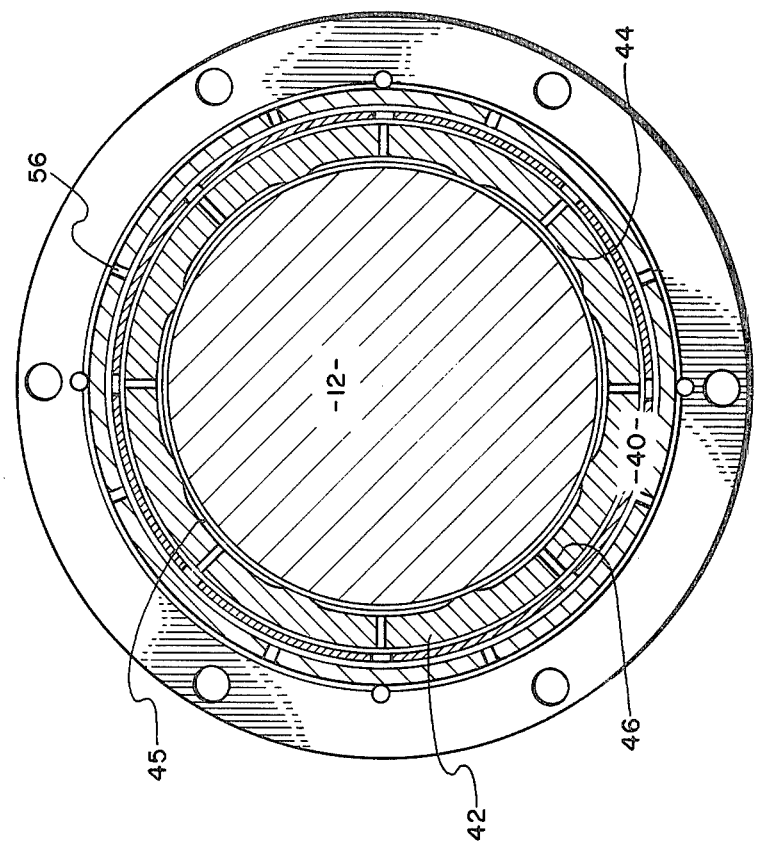
FIG. 4 is a cross-sectional view of the interstage seal taken perpendicular to the axis.

Referring now to FIGS. 3 and 4, there is shown the interstage seal. Like the primary hydrostatic seal 10, the interstage seal 40 is supplied with a purge fluid wherein a small volume of the purge fluid is allowed to leak into the main slurry flow. Basically, the interstage seal 40 works on the same hydrostatic principle as the hydrostatic primary seal 10. However, the differential pressure between the two stages is only 250 psi instead of the maximum about 3500 psi seen by the main seal 10.

It should be noted that in a two-stage pump, two interstage seals are positioned back-to-back at the interface of the two stages. Basically, the interstage seal 40 has the same elements as the hydrostatic seal 10. However, due to the lower pressure seen by interstage seal 40, all components can be made significantly lighter. The purge fluid pressure, instead of being approximately 500 psi higher than the interior pressure, is only about 100 psi above the highest pressure stage, and the seals are adjusted to leak approximately equal amounts of purge fluid into each stage inlet.

Interstage seal 40 is coaxially positioned around the circumference of rotating shaft 12. The floating seal sleeve 42 is designed to yield to any deflection of the rotating shaft 12 without impeding the function of the seal 40. This is effected by having a very small gap 44 interposed in between the rotating shaft 12 and the non-rotating floating seal sleeve 42. Depending upon the specific design requirements of the pump, gap 44 can be varied in size and in its specific geometry. In accordance with the present invention, gap 44 has two components. The first is the gap 44 itself, while the second component comprises at least one pressure restoration pocket 45. Thus, the primary function of the restoration pocket 45 is for restoring the non-rotating floating seal sleeve 42 concentric with the rotating shaft 12 should the floating seal sleeve 42 be forced eccentric for any reason. Then, gap 44 can operate as a high-pressure purge gap wherein high pressure, clean purge fluid would provide a low-level positive flow of purge fluid from gap opening 47. This positive flush would prevent slurry from coming into contact with the interstage seal 40 and would also prevent stagnation of abrasive solid particles in potentially high-wear areas. Purge fluid exiting from the opposite end 49 of seal 40 then interfaces with the pressurized purge fluid contained in the cavity between the two interstage seals. The fluid interface will occur in gap 44. The non-rotating floating seal sleeve 42 additionally comprises at least one anti-rotation pin 51 circumferentially located along the outer wall of the floating seal sleeve 42. In the preferred configuration, a plurality of anti-rotation pins 51 are used. The pins 51 are used for mating non-rotating floating seal sleeve 42 with seal housing 48 and spacer 52, thereby preventing rotating of the floating seal sleeve 42. Finally, the floating seal sleeve 42 has a pair of forward and aft axial seal balancing lands 54. These lands 54, along with the annular forward and aft ends of gap 50, maintain the axial position and balance load on seal 40.

Interposed between non-rotating floating seal sleeve 42 and coaxial seal housing 48 is outer pressure gap 50 approximately fifteen times greater than gap 44. This gap 50 provides for radially pressure dampening the non-rotating floating seal sleeve 42. To accomplish this task, purge fluid is fed through seal housing 48 via purge fluid feed holes 56. From purge fluid heed holes 56, the purge fluid fills gap 50. Once filled, the purge fluid flows through purge fluid transfer holes 46 and into pressure restoration pockets 45 and gap 44, thereby pressurizing the seal. Finally, the aft end of seal housing 40 is mated to the annular retainer ring 58 through clamp nut 60. The retainer ring 58 has been designed for minimum deflection under its individual loading situations.

Thus, it is apparent that there is provided by this invention high-pressure hydrostatic primary and interstage seals.

It is understood that what has been described is merely illustrative of the principles of the invention, and the numerous arrangements in accordance with this invention may be devised by one skilled in the art without departing from the spirit and scope thereof.

What is claimed as new and is desired to be secured by letters patent of the United States is:

1. A hydrostatic seal for high-differential pressure situations, comprises:
   an annular retainer plate having forward and aft ends for mounting said seal;
   an annular seal housing axially and detachably mounted to the forward end of said retainer plate;
   a floating seal sleeve, coaxially located along the interior wall of said seal housing;
   an outer pressure gap interposed between said seal housing and said floating seal sleeve for pressure balancing said floating seal sleeve;
   an annular seal sleeve coaxially located along the interior wall of said floating seal sleeve for mating with a rotating shaft;
   a purge fluid gap interposed between said floating seal sleeve and said seal sleeve; and
   means for pressurizing said seal.

2. The hydrostatic seal of claim 1 wherein said seal housing comprises:
   means for conveying a fluid through said seal housing;
   means for preventing rotation of said floating seal sleeve; and
   an annular aft end pressure restoration pocket located along the aft interior wall of said seal housing.

3. The hydrostatic seal of claim 2 wherein said means for conveying a purge fluid comprises at least one purge fluid feed hole radially located through said seal housing.

4. The hydrostatic seal of claim 3 wherein there is a plurality of purge fluid feed holes.

5. The hydrostatic seal of claim 2 wherein said means for preventing rotation comprises at least one anti-rotation lug.

6. The hydrostatic seal of claim 5 wherein there is a plurality of anti-rotation lugs.

7. The hydrostatic seal of claim 1 wherein said floating seal sleeve comprises:
   means for transferring a purge fluid to the inner periphery of said floating seal sleeve;
   means for preventing rotation of said floating seal sleeve;
   at least one inner pressure restoration pocket circumferentially located along the interior wall of said floating seal sleeve; and
   a pair of forward and aft axial seal balance lands circumferentially located along the forward and aft faces of said floating seal sleeve.

8. The hydrostatic seal of claim 7 wherein said means for transferring a purge fluid to the interior of said floating seal comprises at least one purge fluid transfer hole.

9. The hydrostatic seal of claim 8 wherein there is a plurality of purge fluid transfer holes.

10. The hydrostatic seal of claim 7 wherein said means for preventing rotation of said floating seal sleeve comprises an anti-rotation lug for each anti-rotation lug circumferentially located along the inner wall of seal housing.

11. The hydrostatic seal of claim 7 wherein there is a plurality of pressure restoration pockets.

12. The hydrostatic seal of claim 1 wherein said seal further comprises:
    a shaft sleeve interposed between said seal sleeve and a rotating shaft, and wherein said shaft sleeve becomes an integral part of the rotating shaft.

13. A hydrostatic seal for high-differential pressure situation, comprises:
    an annular retainer plate having forward and aft ends for mounting said seal;
    an annular seal housing axially and detachably mounted to the forward end of said retainer plate and wherein said seal housing comprises:
      a plurality of purge fluid feed holes radially located through said seal housing, for introducing a purge fluid into said seal;
      a plurality of anti-rotation lugs circumferentially located along the inner wall of said seal housing; and
      an annular aft end pressure restoration pocket located along the aft interior wall of said seal housing;
    a floating seal sleeve, coaxially located along the interior wall of said seal housing, and wherein said floating seal sleeve comprises:
      a plurality of purge fluid transfer holes radially located through said floating seal sleeve;
      an anti-rotation lug circumferentially located along the outer wall of said floating seal sleeve, for mating with each anti-rotation lug of said seal housing;
      a plurality of inner pressure restoration pockets circumferentially located along the interior wall of said floating seal sleeve; and
      a pair of forward and aft axial seal balance lands circumferentially located along forward and aft faces of said floating seal sleeve;
    an outer pressure gap interposed between said seal housing and said floating seal for pressure balancing said floating seal;
    an annular seal sleeve coaxially located along the interior wall of said floating seal sleeve for mating with a rotating shaft;
    a purge fluid gap interposed between said floating seal sleeve and said seal sleeve; and
    a shaft sleeve interposed between said seal sleeve and a rotating shaft.

14. An interstage seal for high-differential pressure situations, comprises:

an annular seal housing for containing a seal, wherein said seal housing comprises:
  at least one purge fluid feed hole radially located through said seal housing, for introducing a purge fluid into said seal;
  at least one anti-rotation pin circumferentially located along the inner wall of said seal housing;
a floating seal sleeve, coaxially located along the interior wall of said seal housing, and wherein said floating seal sleeve comprises:
  at least one purge fluid transfer hole radially located through said floating seal sleeve;
  an anti-rotation pin circumferentially located along the outer wall of said floating seal sleeve, for mating with each anti-rotation pin of said seal housing;
  at least one pressure restoration pocket circumferentially located along the interior wall of said floating seal sleeve; and
  a pair of forward and aft axial seal balance lands circumferentially located along forward and aft faces of said floating seal sleeve;
an outer pressure gap interposed between said seal housing and said floating seal sleeve for pressure balancing said floating seal sleeve;
a purge fluid gap interposed between said floating seal sleeve and a pump shaft; and
an annular retainer ring interconnected with the aft end of said seal housing for enclosing said seal.

15. The interstage seal of claim 14 wherein there is a plurality of purge fluid feed holes.

16. The interstage seal of claim 14 wherein there is a plurality of anti-rotation pins.

17. The interstage seal of claim 14 wherein there is a plurality of purge fluid transfer holes.

18. The interstage of claim 14 wherein there is a plurality of pressure restoration pockets.

* * * * *